United States Patent
Bernini

(10) Patent No.: US 7,613,552 B2
(45) Date of Patent: Nov. 3, 2009

(54) LAWN-MOWER WITH SENSOR

(76) Inventor: Fabrizio Bernini, Via della Pace, 3, Mercatale Valdarno Montevarchi (AR) (IT) 52020

( * ) Notice: Subject to any disclaimer, the term of this patent is extended or adjusted under 35 U.S.C. 154(b) by 0 days.

(21) Appl. No.: 12/108,179

(22) Filed: Apr. 23, 2008

(65) Prior Publication Data
US 2008/0282658 A1    Nov. 20, 2008

(30) Foreign Application Priority Data
May 17, 2007    (IT) .................... FI2007A0116

(51) Int. Cl.
*G01C 22/00* (2006.01)
(52) U.S. Cl. .................... 701/23; 180/168; 56/10.2 A
(58) Field of Classification Search ............. 701/23, 701/25, 207; 700/258, 245; 318/580, 568.12, 318/587; 180/168, 169, 274, 279, 275, 277, 180/167; 293/4, 102, 2, 120; 200/61.43, 200/5 A; 56/10.2 A, 10.2 F
See application file for complete search history.

(56) References Cited

U.S. PATENT DOCUMENTS

| | | | | |
|---|---|---|---|---|
| 3,550,714 A * | 12/1970 | Bellinger | ............. | 180/168 |
| 3,563,327 A * | 2/1971 | Mier | ............. | 180/169 |
| 3,570,227 A * | 3/1971 | Bellinger | ............. | 56/10.2 A |
| 3,733,597 A * | 5/1973 | Healey et al. | ............. | 340/562 |
| 3,965,442 A * | 6/1976 | Eaton, Jr. | ............. | 331/116 FE |
| 4,138,649 A * | 2/1979 | Schaffer | ............. | 330/9 |
| 4,777,785 A * | 10/1988 | Rafaels | ............. | 56/10.2 A |
| 4,964,265 A * | 10/1990 | Young | ............. | 56/10.8 |
| 5,007,234 A * | 4/1991 | Shurman et al. | ............. | 56/10.2 R |
| 5,163,273 A * | 11/1992 | Wojtkowski et al. | ............. | 56/11.9 |
| 5,323,593 A * | 6/1994 | Cline et al. | ............. | 56/10.2 A |
| 5,444,965 A * | 8/1995 | Colens | ............. | 56/10.2 A |
| 5,507,137 A * | 4/1996 | Norris | ............. | 56/10.2 J |
| 5,528,888 A * | 6/1996 | Miyamoto et al. | ............. | 56/10.2 F |
| 5,572,856 A * | 11/1996 | Ku | ............. | 56/10.2 A |
| 5,911,670 A * | 6/1999 | Angott et al. | ............. | 56/10.2 A |
| 5,974,347 A * | 10/1999 | Nelson | ............. | 701/22 |
| 6,443,509 B1 * | 9/2002 | Levin et al. | ............. | 293/4 |
| 6,598,692 B2 * | 7/2003 | Angott | ............. | 180/168 |
| 6,604,348 B2 * | 8/2003 | Hunt | ............. | 56/10.6 |
| 6,611,738 B2 * | 8/2003 | Ruffner | ............. | 701/23 |
| 6,984,952 B2 * | 1/2006 | Peless et al. | ............. | 318/580 |
| 2002/0049522 A1 * | 4/2002 | Ruffner | ............. | 701/23 |
| 2002/0104300 A1 * | 8/2002 | Hunt | ............. | 56/10.6 |
| 2003/0023356 A1 * | 1/2003 | Keable | ............. | 701/23 |
| 2005/0034437 A1 * | 2/2005 | McMurtry et al. | ............. | 56/1 |
| 2005/0046373 A1 * | 3/2005 | Aldred | ............. | 318/580 |
| 2006/0059880 A1 * | 3/2006 | Angott | ............. | 56/10.2 A |
| 2006/0161318 A1 * | 7/2006 | Aldred et al. | ............. | 701/23 |
| 2007/0142964 A1 * | 6/2007 | Abramson | ............. | 700/245 |
| 2008/0007193 A1 * | 1/2008 | Jones et al. | ............. | 318/568.12 |

(Continued)

FOREIGN PATENT DOCUMENTS

EP    1612631 A2 *    1/2006

(Continued)

*Primary Examiner*—Árpád Fábián-Kovács
(74) *Attorney, Agent, or Firm*—Pearne & Gordon LLP

(57) ABSTRACT

Lawn-mower comprising one or more motor-driven wheels and at least one cutting device, and further comprising elements for determining a distance value of an external mass to modify the behaviour of the lawn-mower in response to the distance.

25 Claims, 5 Drawing Sheets

U.S. PATENT DOCUMENTS

2008/0039974 A1 * 2/2008 Sandin et al. ............... 700/258

FOREIGN PATENT DOCUMENTS

| EP | 1745686 A1 * | 1/2007 |
|---|---|---|
| FR | 2645700 A * | 10/1990 |
| IT | FI2005A000250 | 5/2007 |
| WO | WO 02062194 A1 * | 8/2002 |
| WO | WO 2007066195 A2 * | 6/2007 |

* cited by examiner

LAWN-MOWER WITH SENSOR

FIELD OF THE INVENTION

The object of the present invention is a lawn-mower which comprises safety sensors for detecting the presence of grass or of external obstacles in proximity of the said lawn-mower.

BACKGROUND OF THE INVENTION

Lawn-mowers are known which do not have any system for detecting a grass surface or an external obstacle close thereto, such as a wall, a fencing, a table, etc.

The above mentioned lawn-mowers exhibit some drawbacks. A first drawback lies in the fact that the known lawn-mowers cannot establish, during their operation, whether they actually cut the grass or run idle.

More specifically, the known lawn-mowers cannot establish, for example, whether they are on a grass surface or on a floor or on any surface with no grass to be cut.

A further drawback is given by the fact the known lawn-mowers are unable to identify possible obstacles along the direction of advancement during their operation, thereby causing unavoidable dangerous conditions for people close to the apparatus.

BRIEF SUMMARY OF THE INVENTION

The object of the present invention is to overcome the said drawbacks by providing a lawn-mower which comprises safety sensors for detecting the presence of grass and/or external obstacles close to the same lawn-mower, and allowing the obtainment of safer and more efficient operating conditions with respect to the known lawn-mowers.

These and further objects, which will appear more clearly from a reading of the following description, are achieved, according to the present invention, by providing a lawn-mower comprising safety sensors for detecting the presence of grass and/or external obstacles close to the same lawn-mower and having structural and functional characteristics according to the appended independent claims, further embodiments thereof being set forth in the corresponding dependent claims herein appended.

BRIEF DESCRIPTION OF THE DRAWINGS

The invention is illustrated herebelow in greater detail with reference to the accompanying drawings which represent one exemplary and not limiting embodiment thereof. In the drawings.

DETAILED DESCRIPTION OF THE INVENTION

Figure 1:
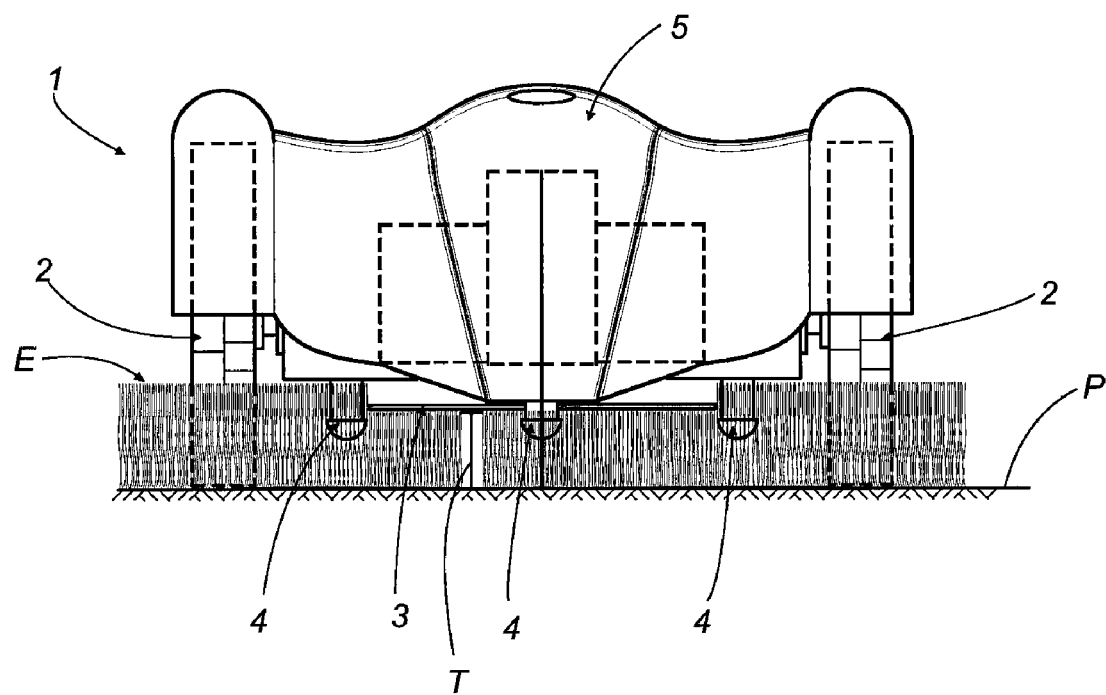
FIG. 1 is a front view of a lawn-mower according to the invention.
Figure 2:
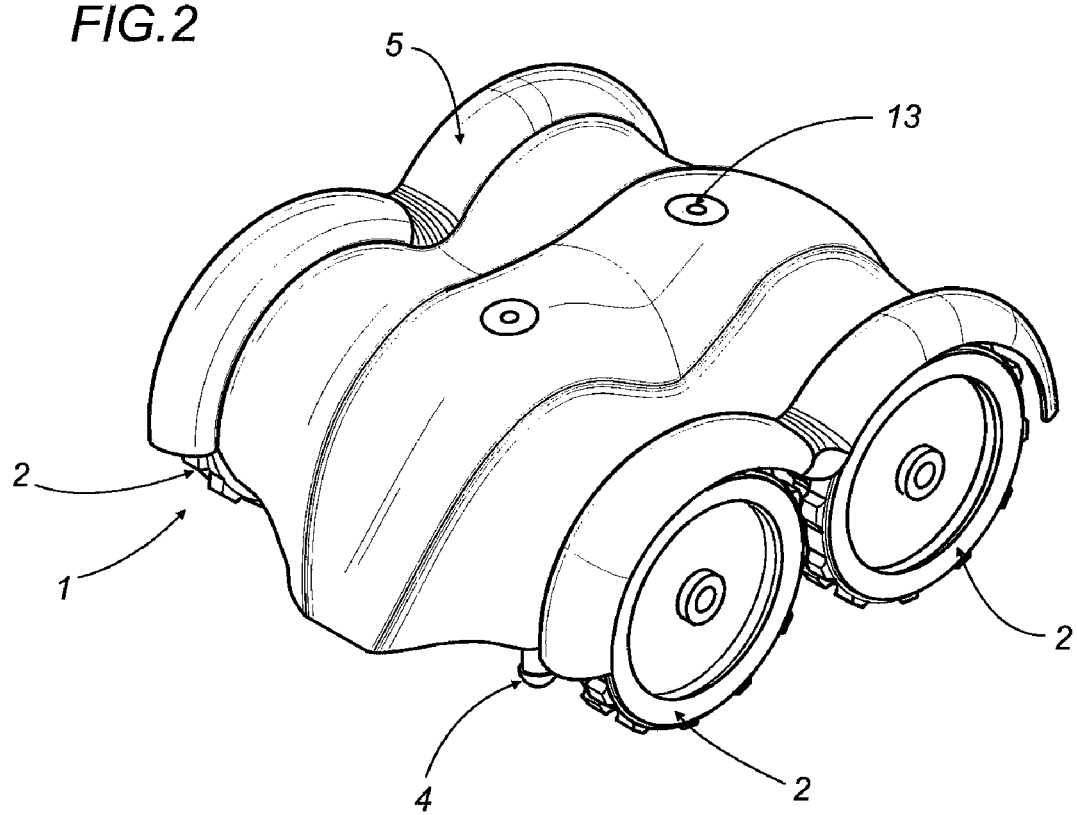
FIG. 2 is a perspective view of the lawn-mower of FIG. 1.
Figure 3:
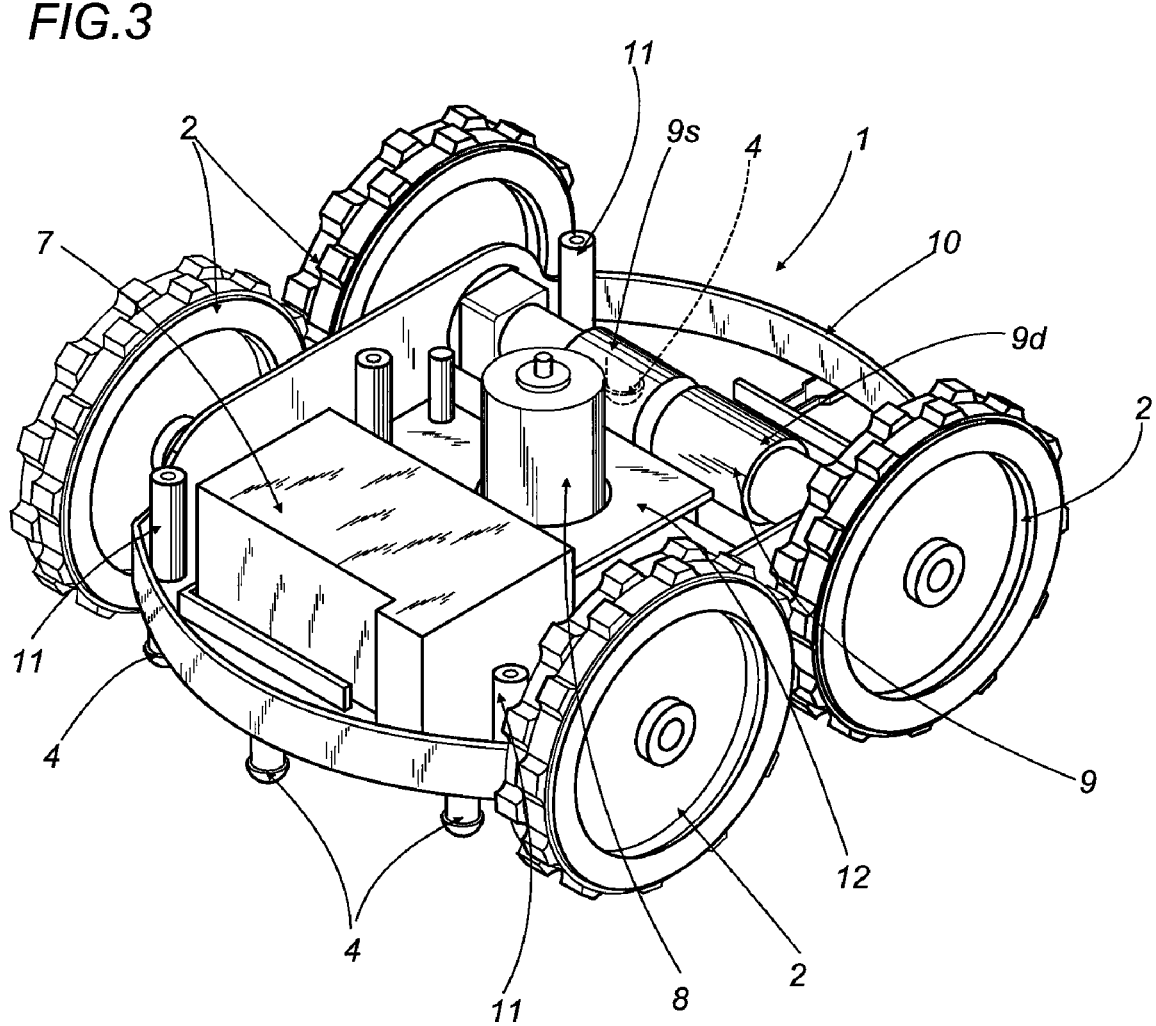
FIG. 3 is a perspective view of the lawn-mower of FIG. 1 without the external shell or case.

Described herebelow with reference to FIGS. 1-7 is a lawn-mower according to the invention.

The lawn-mower 1 comprises an upper shell 5 removably attached to a lower shell 10 by means of bearing elements 11.

Within and below the upper shell 5, and housed in the lower shell 10, there are also mounted one or more motors 8/9 which drive into motion a cutting device or blade 3 and an array of wheels 2, respectively.

The motors 8 and 9 are connected to the blade 3 and wheels 2 via mechanical transmissions, such as belts and/or gears, of a type known per se and not to be described therefore in greater detail.

Preferably, the motors 8/9 are electric motors able to be fed by a battery 7 of rechargeable type, for example.

In a preferred embodiment, the recharge of battery 7 is via an electric coupling 13 of inductive type, for example.

Also inserted inside the shell 5 is an electronic control unit 12 interfaced with the motors 8 and 9 to independently operate the blade 3 and wheels 2.

The electronic unit 12 is preferably of programmable type allowing the input of data associated with the operation of the lawn-mower 1, such as a given height T of grass to be cut and/or a safety distance H from the lawn-mower.

According to the invention, the electronic unit 12 is also connected to an array of presence sensors 4 attached to one or more points of the lawn-mower 1.

For example, and as shown in FIG. 1, at least one sensor 4 is fixed below and at a predetermined distance from the blade 3 and from the plane P, the latter being defined by the lower bearing points of wheels 2.

Figure 5:
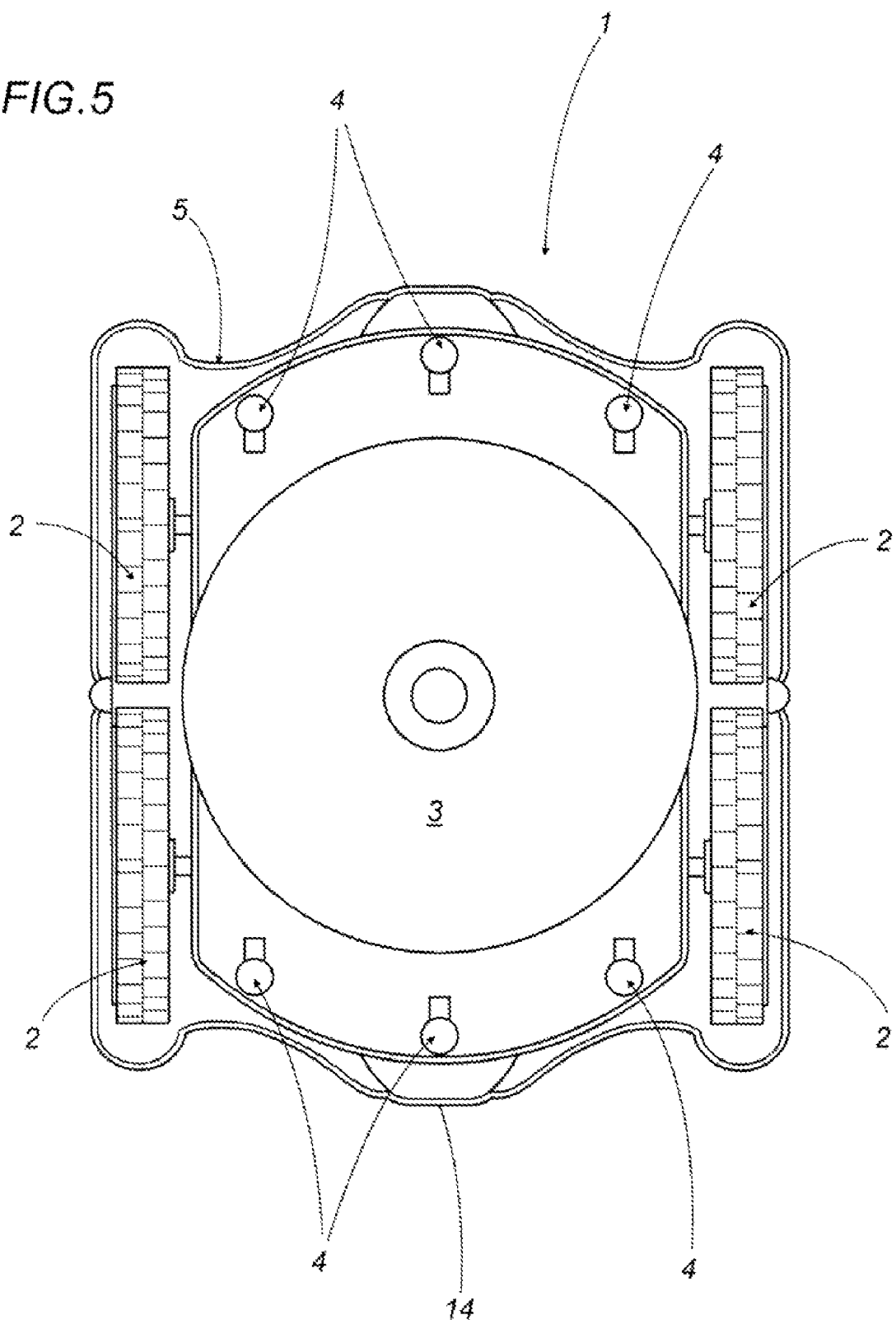
FIG. 5 is a bottom view of the lawn-mower of FIG. 1.

Besides, FIG. 5 shows the disposition of at least one sensor 4 at a predetermined distance from a point 14 of the lawn-mower's external shell 5/10, for example the furthermost point of its front.

The sensors 4 are predisposed for detecting the presence of a mass at a predetermined distance that can be preset in the control unit 12, for controlling the operation of the lawn-mower 1.

More specifically, the distance between the sensors 4 and the mass may be greater than or equal to zero, the latter care corresponding to contact condition.

In particular, the functions controlled on the basis of the state of sensors 4 are the cutting and safety functions.

In the first case, the sensors 4 are used for detecting the presence of regions of a grass surface having a height either lower or higher than a preset value T, and for conditioning the direction of the lawn-mower's motion in order to keep the same lawn-mower within regions of the grass surface which need to be cut.

In the second case, the sensors 4 are used for detecting the presence of an external body M, for example a person, at a distance lower than a preset safety value H, and for interrupting the blade's operation when such condition takes place.

In operation, and with reference in particular to the function for the acknowledgment of the presence of a grass surface, in a lawn-mower 1 according to the invention, the acknowledgment of the presence of a grass surface E under the lawn-mower 1 is based on the evaluation of the height of the cutting device 3 and, therefore, of the height of the same grass, with respect to the bearing plane P of wheels 2, the said evaluation taking into account the fact that the grass cannot be cut below a given height, for example, 1-3 cm.

Upon establishing a height of cut equal to a dimension T, and after putting this value into the programmable control unit 12, the sensor 4 is able to acknowledge the presence or not of a mass below and/above the dimension T.

If a mass or grass is sensed above T, the detection is interpreted as the presence of grass which is still to be cut, so that the control unit 12 gives instructions to the motor drive of the lawn-mower 1 to keep the latter on its path according to the preset program.

If above T there is no grass, but there is some below T, this detection is interpreted as a condition which requires to inform the control unit 12 that the lawn-mower 1 is in a region of grass surface already cut and to command a variation of motion direction to search for a grass surface which is still to be cut, or to command the conclusion of the cut program, for example with the return of the lawn-mower to a base thereof.

Finally, if the sensor 4 detects that below the dimension T there is no presence of a mass, this condition is interpreted as absence of grass surface in that region of the ground.

In this case, the lawn-mower 1 is, for example, on a floor at the boundary of a grass surface, and the control unit 12 is able to deactivate the cutting blade 3 or to drive the lawn-mower 1 along a different direction.

According to the invention, the lawn-mower 1 can therefore operate by remaining within a region of grass surface all the time, inasmuch as the sensor 4 is able to modify its path in order to return within the boundaries thereof without using further perimeter tracking devices.

The work programs can be preset in the control unit 12 and be adapted to the occurrence of possible different operating conditions which are signalled to the unit 12 by one or more detection sensors 4.

Figure 4:
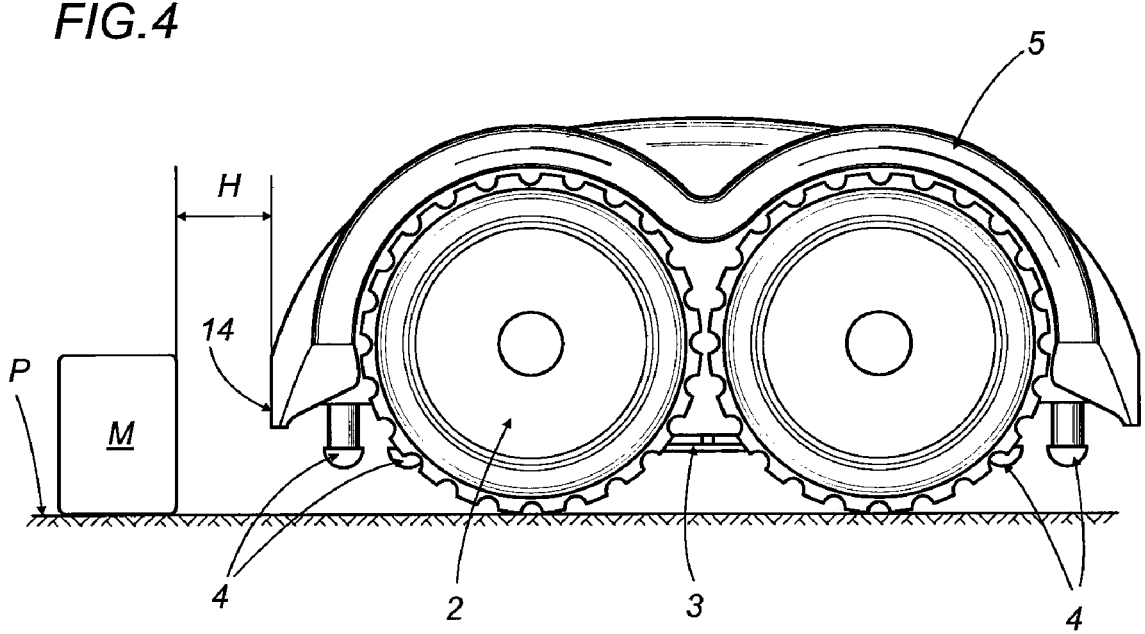
FIG. 4 is a side view of the lawn-mower of FIG. 1.

Advantageously, the sensors 4 can be mounted breadthwise in the front, at the back and sideways of the shell or case 5 of the lawn-mower 1, or just under the cutting device 3, depending on how much lawn surface and how many areas surrounding the lawn-mower 1 are to be controlled at the same time by the sensors 4. Described herebelow, with reference to FIG. 4, is the operation of a lawn-mower 1 according to the invention, in relation to the functions of proximity and safety detection.

In this case, the acknowledgment of the presence of a mass M is based on the evaluation of a state variation that a (bodily and/or vegetal) mass M may cause in the sensor 4.

Upon an initial phase, the lawn-mower 1 operates against a "free background", that is, it has no mass in front, nor laterally, nor at the back thereof.

Starting from this initial condition, one or more distances H are established as "intervention distances" of sensor 4 with respect to the mass M.

In this way, as soon as there is a presence within the intervention distance, the sensor 4 receives a pulse for deactivating the blade 3, then the direction of work is reversed and, when the lawn-mower is again in a safe state, with the sensor 4 being switched off, the blade 3 is activated again.

As far as the safety function is concerned, the behaviour of the lawn-mower 1 is determined by the programs set up in the unit 12 and operated in base of the detection of a presence by the sensors 4.

In a preferred embodiment, a suitable presence sensor 4 is an electronic proximity sensor able to detect the perturbation induced in a neighbouring volume by an object, and to translate this perturbation into an electric signal.

The sensor comprises in particular a detection terminal component, such as a wire or a metal sheet, connected to an electric circuit or an electronic device able to transfer and possibly amplify a signal introduced into the terminal, so as to act as an aerial for the presence sensor 4.

The detection terminal is then connected to junction MOS components (metal-oxide-semiconductor) of parasite effect, thus making it possible to affect the electric behaviour of the same components by solely perturbing the air volume close to sensor 4. Advantageously, the sensor 4 may comprise an oscillator with an inverting gate of a Schmitt circuit, or any other device comprising at least one component made through the metal-oxide-semiconductor junction technology and able to provide, in response to variations of an input signal, an electric output oscillation.

Figure 7:
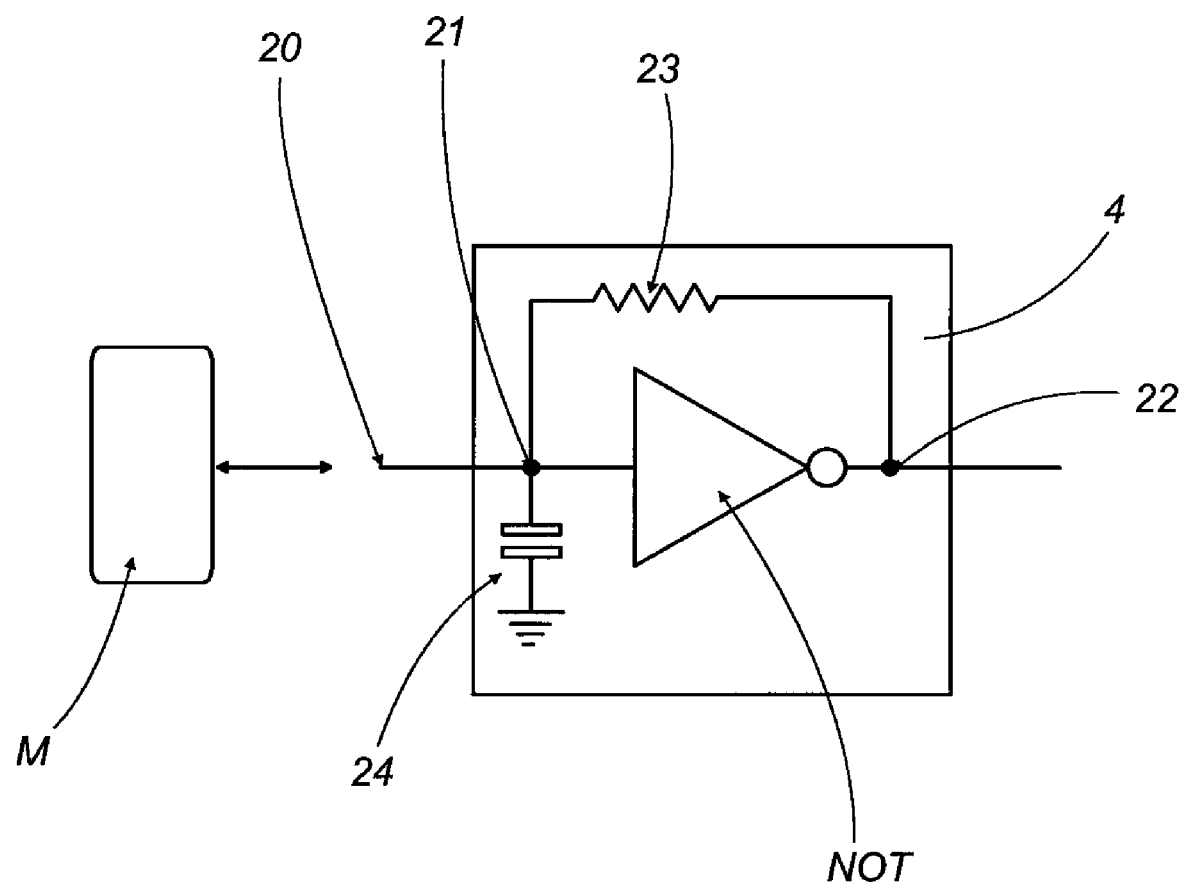
FIG. 7 is a preferred embodiment of a presence sensor that can be used in the lawn-mower according to the invention.

A description of this preferred embodiment is given in the invention patent application No. FI20005A000250 and is schematically represented in FIG. 7.

In the example of FIG. 7, a logic "NOT" inverter of MOS technology is configured as a Schmitt circuit-oscillator by connecting the input terminal 21 to the output terminal 22 via an impedance 23, and connecting a capacitor 24 between said input terminal and the ground. The same input terminal, moreover, is connected to the aerial 20 so that, a perturbating body M moving close to the aerial 20 causes a variation of the oscillation frequency at the output terminal of the logic inverter, such variation being proportional to the distance of said perturbating body M from the aerial 20.

It is understood, however, that the sensors 4 can be of mechanical, optical, chromatic, radio, capacitive, inductive, ultrasound or other type, as long as they are able to acknowledge whether under the elevation T there is or not the presence of grass surface and/or whether a foreign mass M is present or not at distance H from the lawn-mower, and to signal such event to the control unit 12.

Figure 6:
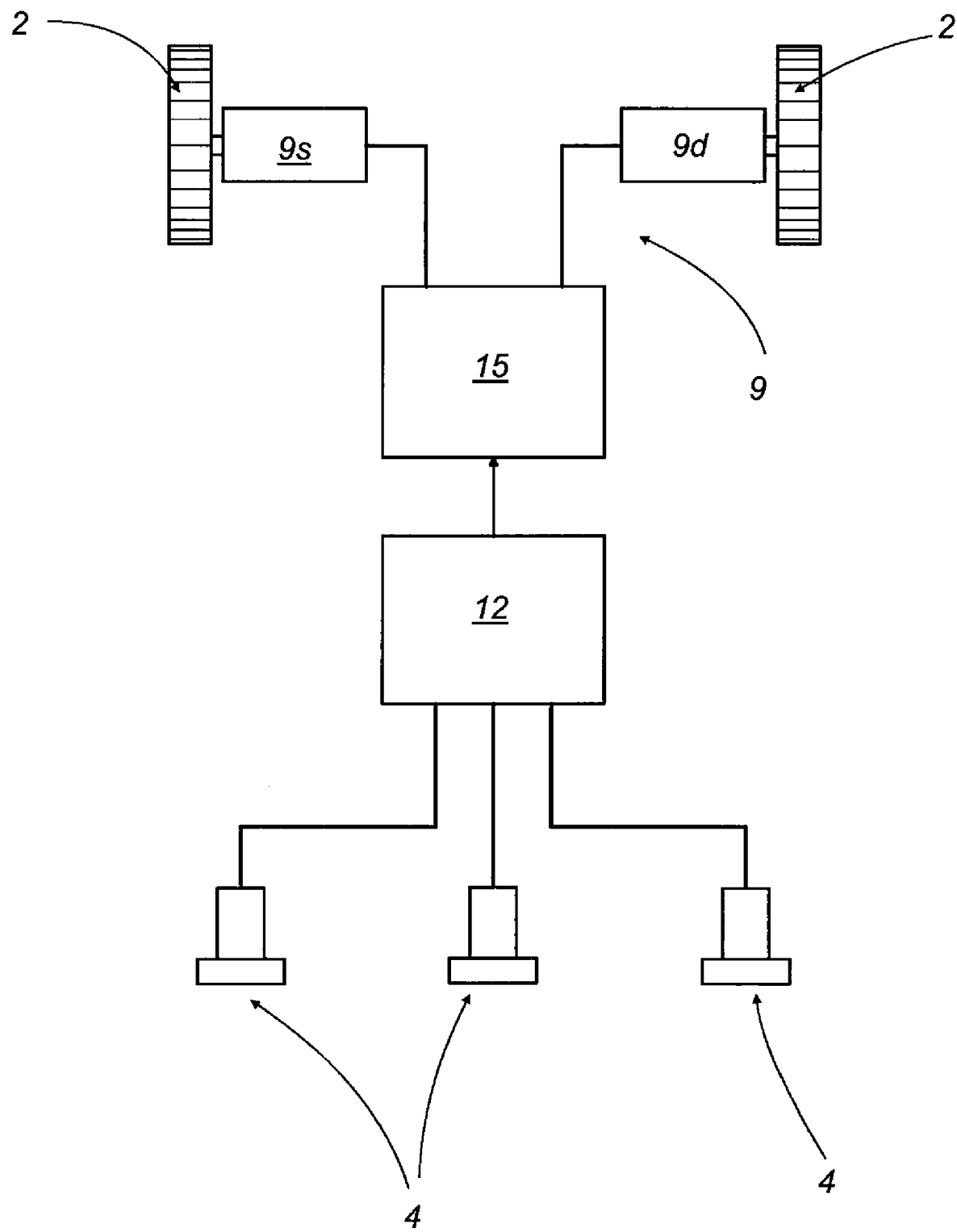
FIG. 6 is a schematic diagram of the connections between sensors, control unit and driven members of the lawn-mower of FIG. 1.

FIG. 6 is a schematic diagram of a preferred embodiment of the invention, the figure showing the connections between the sensors 4, the unit 12 for controlling the sensors 4, the unit 15 for controlling the movement of wheels 2 and the motor 9 of same wheels 2.

In particular, the motor 9 is advantageously subdivided into a first motor 9s for independently driving at least one left wheel, and a second motor 9d for independently driving at least one right wheel.

In use, the sensor(s) 4 feed(s) a signal of presence/absence of a grass surface or an obstacle in proximity of the lawn-mower, depending on the preset operating mode, to the control unit 12.

Depending on the received type of detection, the same control unit 12 communicates with the wheel's control unit 15 for varying or not the velocity of the individual driving wheels 2.

Depending on the operating mode chosen and the type of detected mass, the control unit can be programmed to command the blocking of the wheels, or a different velocity of the right and left wheels 2 so as to cause the lawn-mower 1 to turn.

The invention thus conceived is evidently suited for industrial application; the same invention can also be subjected to several modifications and changes falling within the scope of the inventive idea; moreover, all the parts may be replaced by other elements technically equivalent.

The invention claimed is:

1. Lawn-mower (1) comprising:
   a motor-drive (2),
   a cutting device (3),
   a presence sensor (4) for detecting a presence of an external mass within a predetermined distance which is greater than or equal to zero,
   a grass sensor for detecting regions of grass having a surface height that is indicative of an uncut region of grass that has not already been cut, and
   means for operating said lawn-mower (1) in response to receiving a signal from said grass sensor and said presence sensor (4), wherein said means for operating said lawn-mower controls operation of said motor-drive to direct said lawn-mower to said uncut region of grass and said presence sensor comprises an electronic proximity sensor that includes an oscillator comprising a metal-oxide-semiconductor (MOS) junction, wherein the oscillator provides an electric output oscillation in response to variations of an input signal.

2. Lawn-mower according to claim 1, further comprising a shell, the motor-drive being activable or deactivable under control and comprising one or more motor-driven wheels associated with said shell, the cutting device (3) being activable or deactivable under control and attached to said shell, the lawn-mower having means for determining a distance value of the external mass detected by said presence sensor from at least one point of the shell.

3. Lawn-mower according to claim 1, wherein said means for operating the lawn-mower (1) comprise means for modifying the condition of motion of the lawn-mower (1).

4. Lawn-mower according to claim 1, wherein said means for operating the lawn-mower comprise means for interrupting or restoring the operation of said cutting device (3).

5. Lawn-mower according to claim 1, wherein the presence sensor (4) is able to detect the presence or absence of a grass surface (E) above and/or below a predetermined height (T).

6. Lawn-mower according to claim 1, wherein the presence sensor (4) is able to detect the presence of the external mass including an external body at a horizontal distance (H).

7. Lawn-mower according to claim 1, wherein the cutting device (3) is a rotating blade disposed under a shell.

8. Lawn-mower according to claim 1, wherein the presence sensor (4) is disposed below and in close proximity to the cutting device (3).

9. Lawn-mower according to claim 1, wherein a frequency of said electric output oscillation varies in proportion to said predetermined distance of said external mass from said presence sensor.

10. Lawn-mower according to claim 1, wherein said oscillator comprises an inverting gate of a Schmitt circuit.

11. Lawn-mower according to claim 10, wherein a frequency of said electric output oscillation at an output terminal of said Schmitt circuit varies in proportion to said predetermined distance of said external mass from said presence sensor.

12. Lawn-mower according to claim 1, wherein said predetermined distance in which the external mass is to be detected by said presence sensor is programmable.

13. Lawn-mower according to claim 12, wherein said means for operating said lawnmower deactivates said cutting device when said external mass is detected within said programmable predetermined distance from said lawn-mower.

14. Lawn-mower according to claim 1, wherein said grass sensor outputs a signal to said means for controlling said lawn-mower to indicate when said lawn-mower is disposed over a non-grass surface.

15. Lawn-mower according to claim 1, wherein at least one of said grass sensor and said presence sensor extends vertically below said cutting device.

16. Lawn-mower according to claim 1, wherein said surface height indicative of said uncut region of grass is programmable.

17. Lawn-mower according to claim 1, wherein an output signal from at least one of said grass sensor and said presence sensor is amplified.

18. Lawn-mower according to claim 10, wherein an input to said inverting gate of said Schmitt circuit is electrically connected to both an output of said Schmitt circuit and an output of said presence sensor to produce a variation of an oscillation frequency at said Schmitt circuit in response to said external mass being disposed within said predetermined distance of said lawn-mower.

19. Method for operating a lawn-mower (1) according to claim 1, the method comprising the steps of detecting the presence of a mass within a predetermined distance which is greater than or equal to zero, detecting a surface height of grass indicative of an uncut region of grass, and operating said lawn-mower (1) in response to said presence detection and said surface height detection to maintain said lawn-mower adjacent said uncut region of grass.

20. Method according to claim 19, wherein said lawn-mower (1) comprises a shell, and said presence detection consists of the detection of the mass within a distance from a point of said shell.

21. Method according to claim 19, wherein said presence detection comprises a proximity detection.

22. Method according to claim 19, wherein said step of detecting the presence of a mass comprises the detection of a surface below a height (T), and said step of operating the lawn-mower (1) comprises a step of modifying the direction of motion of the lawn-mower (1) and of searching for a cut region with the presence of a grass surface.

23. Method according to claim 19, wherein said step of detecting the presence of a mass comprises the detection of a presence of a grass surface above a height (T), and said operating step comprises an actuation of the cutting device.

24. Method according to claim 19, wherein said step of detecting the presence of a mass comprises the detection of a presence of a grass surface below a height (T) and an absence of grass surface above said height (T).

25. Method according to claim 19, wherein said step of detecting the presence of a mass comprises the detection of a presence of an external body within a predetermined distance (H), and said step of operating the lawn-mower (1) comprises a step of interrupting an operation of the cutting device (3).

* * * * *